United States Patent [19]
Morimoto et al.

[11] Patent Number: 5,578,377
[45] Date of Patent: Nov. 26, 1996

[54] COLORED THIN FILM-FORMING COATING SOLUTION AND COLORED THIN FILM OBTAINED BY SUCH COATING SOLUTION

[75] Inventors: Takeshi Morimoto; Kazuya Hiratsuka; Yasuhiro Sanada; Keiko Ohashi; Keisuke Abe; Takeshi Kawasato, all of Yokohama, Japan

[73] Assignee: Asahi Glass Company Ltd., Tokyo, Japan

[21] Appl. No.: 230,860

[22] Filed: Apr. 21, 1994

[30] Foreign Application Priority Data

Apr. 21, 1993 [JP] Japan .................................. 5-117931
Aug. 27, 1993 [JP] Japan .................................. 5-235668

[51] Int. Cl.$^6$ ............................................. B32B 15/04
[52] U.S. Cl. ........................ 428/426; 428/428; 428/432; 428/429; 428/446; 428/698; 428/701; 428/702; 313/479; 106/286.4; 106/287.1; 106/287.14; 359/580
[58] Field of Search .................................... 428/698, 702, 428/704, 426, 432, 428, 429, 446, 447, 697, 689; 313/478, 479, 480, 489, 493, 635; 106/18.32, 600, 603, 286.1, 286.4, 286.7, 287.1, 287.14

[56] References Cited

U.S. PATENT DOCUMENTS

| | | | |
|---|---|---|---|
| 4,098,956 | 7/1978 | Blickensderfer | 428/627 |
| 4,731,303 | 3/1988 | Hirano | 428/700 |
| 4,837,123 | 6/1989 | Kato | 430/269 |
| 4,861,669 | 8/1989 | Gillery | 428/434 |
| 4,918,138 | 4/1990 | Hara | 524/785 |
| 4,920,006 | 4/1990 | Gillery | 428/432 |
| 5,243,255 | 9/1993 | Iwasaki | 313/478 |
| 5,270,768 | 12/1993 | Murata | 355/219 |
| 5,336,565 | 8/1994 | Muromachi | 428/432 |

FOREIGN PATENT DOCUMENTS 129209  12/1976  Germany .

*Primary Examiner*—Ellis Robinson
*Assistant Examiner*—Leonidas J. Jones, III
*Attorney, Agent, or Firm*—Oblon, Spivak, McClelland, Maier, & Neustadt, P.C.

[57] ABSTRACT

A coating solution for forming a colored thin film, which contains a metal oxide containing nitrogen.

34 Claims, No Drawings

COLORED THIN FILM-FORMING COATING SOLUTION AND COLORED THIN FILM OBTAINED BY SUCH COATING SOLUTION

BACKGROUND OF THE INVENTION

1. Field of the Invention

The present invention relates to a coating solution for forming a colored thin film as well as a colored thin film, a colored antistatic film, a colored low reflection (i.e., anti-reflective) film or a colored low reflection antistatic film obtainable by coating such a coating solution on e.g. a face panel of a cathode ray tube, and a method for its production.

2. Discussion of Background

With respect to a method for coating an antistatic film, a colored thin film, a colored antistatic film, a low reflection antistatic film or a colored low reflection antistatic film, many studies have been made not only on optical equipments but also on consumer equipments, particularly cathode ray tubes (CRT) for televisions or computer terminals.

With respect to antistatic treatment, for example, Japanese Unexamined Patent Publication No. 76247/1988 proposes a method of forming conductive oxide layers of e.g. tin oxide and indium oxide by a CVD method by heating the panel surface of a cathode ray tube at a temperature of about 350° C.

With respect to coloring the film, Japanese Unexamined Patent Publication No. 275664/1989 proposes a method of using a water-soluble phthalocyanine compound. Further, with respect to a colored thin film having an antistatic performance, Japanese Unexamined Patent Publication No. 251545/1989 discloses an antistatic film employing methyl violet.

With respect to low reflectance, it has been common, for example, to provide a $SiO_2$ layer having fine roughness on the surface in order to provide an anti-glare effect to the surface of the face panel of the cathode ray tube as disclosed in Japanese Unexamined Patent Publication No. 118931/1986, or to provide surface roughness by etching with hydrofluoric acid. However, such a method is so-called non-glare treatment to scatter exterior lights and is not essentially a means to provide a low reflection layer, whereby reduction of the reflectance is rather limited, and in the case of a cathode ray tube, such tends to cause a deterioration of the resolution.

With respect to a low reflection antistatic film, Japanese Unexamined Patent Publication No. 93136/1991 discloses a method of forming an optical multi-layer film by an ion plating method.

Among the above-mentioned methods, the technique to form an antistatic film by a CVD method has not only a drawback that a high cost is required for the apparatus but also a problem that since the face plate of the cathode ray tube is heated at a high temperature, the phosphor in the cathode ray tube tends to fall off, and the dimensional precision tends to deteriorate. In such a case, a high temperature at a level of 400° C. is usually required, and there has been a problem that if baking is conducted at a low temperature, a film having a sufficiently low resistance can hardly be obtained.

The above-mentioned method in which a water-soluble phthalocyanine compound is employed for the colored thin film, has a drawback that since the organic dye is employed, the film is poor in the heat resistance and weather resistance and has absorption at a certain specific wavelength, whereby it tends to be difficult to obtain uniform absorption over the entire wavelength range of visible lights. For the same reasons, the antistatic film containing methyl violet as disclosed in Japanese Unexamined Patent Publication No. 251545/1989 is poor in the heat resistance and weather resistance and has a difficulty that uniform absorption can hardly be obtained over the entire wavelength range of visible lights.

The ion plating method is not industrially inexpensive, and it is hardly possible to thereby attain uniform absorption over the visible light wavelength range, whereby no improvement of the contrast can be expected when such a film is applied to a cathode ray tube.

SUMMARY OF THE INVENTION

It is an object of the present invention to solve the above-mentioned conventional problems and to provide anew a colored thin film, an antistatic colored thin film and a low reflection anti-reflective antistatic colored thin film feasible for low temperature treatment and a method for their production.

The present invention provides a coating solution for forming a colored thin film, which contains a metal oxide containing nitrogen.

The colored thin film, the colored antistatic film and the colored low reflection (i.e., anti-reflective) antistatic film of the present invention are preferably employed for glass products useful for display.

With respect to cathode ray tubes as such glass products, not only a high level of resolution but also high contrast is required in recent years particularly when they are used for e.g. display of computer terminals. However, if the transmittance of glass itself is reduced in a attempt to improve the contrast, too much reduction of the transmittance will be problematic especially for a large size display, since the wall thickness of the face plate is thick as the display size increases.

According to the present invention, a film is formed on the surface of glass without reducing the transmittance of the glass itself, so that the contrast is improved by absorption of lights by this film. Accordingly, the present invention can readily be applied to glass panels for display having various wall thicknesses. Emission spectra of a cathode ray tube are constituted by a plurality of spectra. To improve the contrast without disturbing the balance of the emission spectra, it is preferred to employ a colored thin film having uniform light absorption over the visible light range rather than a colored thin film having light absorption at a specific wavelength.

The present invention is based on a discovery that by constructing a colored thin film so that it contains a metal oxide containing nitrogen, uniform light absorption can be attained over a visible light range, particularly from 380 to 780 nm, whereby the above problem can be solved.

DETAILED DESCRIPTION OF THE PREFERRED EMBODIMENTS

In the present invention, the metal oxide containing nitrogen (hereinafter referred to as a nitrogen-containing oxide) is not particularly limited. However, an oxide of titanium containing nitrogen (hereinafter referred to as titanium oxide nitride) is preferred, and $TiO_x$ ($1.0 \leq x < 2.0$) containing from 0.1 to 30 wt % of nitrogen is particularly preferred. If $x<1$, the refractive index will be less than 1.9, such being undesirable. On the other hand, if x is not less than 2.0, desired electrical conductivity can not be obtained.

To stabilize the nitrogen atom in the oxide, it is preferred to incorporate at most 5.0 wt %, based on the titanium oxide nitride, of an element of Groups 3 to 11 in the short form of the Periodic Table, for example, a transition metal element such as V, Nb or Ta. In the present invention, as the titanium oxide nitride particles, titanium oxide subjected to reduction treatment may be employed. For the reduction treatment, $N_2$ gas, $NH_3$ gas or the like can be employed.

In the present invention, the nitrogen-containing oxide preferably has a particle size of from 5 to 200 nm. Here, the particle size means an average primary particle size of particles. If the particle size is less than this range, no adequate coloring performance can be obtained from the viewpoint of opacifying power of the particles. On the other hand, if the particle size is larger than the above range, the surface roughness tends to be too much, and the haze increases, such being undesirable.

Other nitrogen-containing oxides to be pulverized and peptized by the present invention are not particularly limited, and they may, for example, be $Cr_2O_{3-x}$ ($0<x<3$) containing from 0.5 to 25 wt % of nitrogen, $ZrO_x$ ($1.0 \leq x<2$) containing from 0.5 to 30 wt % of nitrogen, $HfO_x$ ($1.0 \leq x<2$) containing from 0.1 to 35 wt % of nitrogen, $AlN_x$ ($0<x<1$) containing from 1 to 40 wt % of oxygen, $Si_3N_x$ ($0<x<1$) containing from 1 to 35 wt % of oxygen, $NbN_x$ ($0<x<1$) containing from 1 to 28 wt % of oxygen, $TaN_x$ ($0<x<1$) and $VN_x$ ($0<x<1$).

With respect to $TiO_x$ ($1 \leq x <2$) containing from 0.1 to 30 wt % of nitrogen, if the nitrogen content is less than this range, no adequate coloring degree can be attained, and if the content is larger than this range, the red color hue increases, whereby uniform light absorption tends to be hardly obtained when the oxide is applied to a colored thin film, such being undesirable. Among these nitrogen-containing oxides, nitrogen-containing oxides of Ti or Cr exhibit a black color, and they are suitable for use as the coloring materials.

Nitrogen-containing oxides of Zr, Hf, V, Ta and Nb are excellent for use as conductive components or conductivity-assisting components from the viewpoint of the electrical conductivity. Nitrogen-containing oxides of Al and Si have high hardness, and they are suitable for use as film-reinforcing components in films. Nitrogen-containing oxides ($TiO_x$ ($1.0 \leq x<2.0$) containing from 0.1 to 30 wt % of nitrogen) have heretofore been used for e.g. coating materials as inorganic coloring sources of black color. However, when they are diluted with an organic solvent consisting of at least one member selected from the group consisting of aliphatic hydrocarbons, halogenated hydrocarbons, alcohols, ketones, ethers, esters, alcohol esters, ketone esters, ether alcohols, ketone ethers and ester ethers, the thickness of the coated films tends to be nonuniform, or flocculation or precipitation tends to occur. Therefore, they were not useful for thin films, especially for optical thin films whose thickness is at most 0.5 μm, although they were useful for thick films such as coating materials or for cosmetic products.

The present invention provides a colored thin film-forming coating solution which is free from flocculation or precipitation even when diluted with an organic solvent consisting of at least one member selected from the group consisting of aliphatic hydrocarbons, halogenated hydrocarbons, alcohols, ketones, ethers, esters, alcohol esters, ketone esters, ether alcohols, ketone ethers and ester ethers and which is useful under a wide range of coating conditions, whereby there will be no unevenness in the film thickness after the coating, by employing titanium oxide nitride particles and a compound of the formula $Si(OR)_mR_n$ (wherein $m+n=4$, $m=1$ to 4, $n=0$ to 3 and $R=C_1-C_4$ alkyl group) or its hydrolyzate.

To apply such a nitrogen-containing oxide to coating, the particles should be dispersed in the solution in the form of a sol.

Heretofore, as oxide sols, silica sol, alumina sol, tin oxide sol and titania sol have, for example, been known. Various methods have been proposed for their production. For example, with respect to the silica sol, a method for dealkalizing an aqueous alkali metal silicate solution or a method for hydrolyzing an inorganic salt or a metal alkoxide is known.

However, with respect to a sol for a nitrogen-containing oxide, no appropriate peptization and pulverization method has been known, since the particle surface of the nitrogen-containing oxide itself is different from the surface of an oxide. Further, when a sol is applied for a functional thin film, it is frequently required to use two or more sols in admixture in order to improve various characteristics of the functional thin film (such as low reflectance, antistatic property, electromagnetic shielding property,-improvement of the contrast by coloring).

However, it is extremely difficult to prepare a mixed sol of two or more different particles due to e.g. the difference in the equipotential points of the surfaces in the sol solution among the different particles, and even mixing of sols prepared from a single substance is possible only within a very narrow range of conditions for the same reason. No sol solution containing a nitrogen-containing oxide has been known in which two or more different particles are dispersed uniformly in water or in an organic solvent.

Due to its oxygen deficiency, titanium oxide nitride has electrical conductivity by itself. Accordingly, when this powder is used for forming a coated film, an antistatic effect can be obtained.

However, there has been no practical method for dispersing and peptizing this powder. Therefore, it has been difficult to apply it to a thin film of a submicron order, although it may be useful for a thick film such as a coating material. With the conventional technique for dispersion and peptization, it has been impossible to apply it to a display plate of a display device such as a cathode ray tube, since the haze used to be high. Further, with respect to applications in which it is necessary to form an optical thin film having a low reflection characteristic, it is required to control the film thickness in the order of a few hundreds Å, and it is necessary that the average particle size of the sol is at a level of submicron or smaller.

The present invention provides a coating solution containing a superfine particle sol obtained by peptizing and pulverizing an object to be pulverized in a solvent by means of quartz beads having an average particle size of at most 0.1 mm. The present invention further provides a coating solution containing a superfine. particle sol obtained by peptizing and pulverizing an object to be pulverized in a solvent by means of quartz beads having an average particle size of at most 0.1 mm, followed by heating.

In the present invention, a compound of at least one element selected from the group consisting of Sn, In, Sb, Zn, Al and Ga, for example, oxide particles of such element having an average primary particle size of from 5 to 200 nm, can be used.

In the present invention, unitary mixing and pulverization are conducted from the initial stage of pulverization and peptization, and the subsequent peptization treatment under heating is also carried out by unitary peptization treatment, whereby it is possible to prevent compression breakage of electric double layers at the surfaces of different particles. According to the present invention, by means of quartz beads having an average particle size of at most 0.1 mm, pulverization to a submicron order has been made possible, which used to be the limit by conventional physical pulverization methods.

Heretofore, quartz beads for pulverization have been available with an average particle size of 0.2 mm. With beads of such a size, the pulverization and peptization efficiency was poor, and in the case of pulverization of a sol containing a nitrogen-containing oxide, the average particle size of the pulverized product used to be at a level of 200 nm at the best, and it used to be difficult to produce a superfine particle sol. With respect to beads other than quartz, for example, when $ZrO_2$ is used, if the average particle size is at the same level, pulverization efficiency of the same level can be obtained, but in the case of $ZrO_2$ beads, when such beads are used repeatedly the pulverization efficiency changes and is poor in the reproducibility, due to cracks on the beads surface which are believed to be formed during the pulverization.

In the present invention, it is preferred to use a basic aqueous solution as the medium during the pulverization by means of quartz beads, and during the pulverization, beads themselves are polished, whereby high pulverization efficiency can be obtained with high reproducibility without cracking. The basic aqueous solution to be used in the present invention, is not particularly limited. However, for example, a basic aqueous solution containing at least 5 wt %, based on the object to be pulverized, of at least one member selected from the group consisting of lithium hydroxide, sodium hydroxide and potassium hydroxide, is preferred.

With respect to the ultimate average particle size by pulverization, it is preferred to conduct pulverization to such an extent that the flocculated average particle size is at most 150 nm, although it varies depending upon the type of the sol. If the flocculated average particle size is larger than this limit, such a sol is not suitable as a sol solution for optical films of from 80 to 150 nm.

In the present invention, with respect to the heat treatment during pulverization and peptization, the temperature for the treatment is preferably from 50° to 100° C. and the time is required to be at least one hour If the temperature is less than this range, the pulverization and peptization tends to be remarkably poor. On the other hand, if the temperature is higher than this temperature range, such an operation is usually practically impossible under atmospheric pressure. Further, heat treatment under pressure tends to promote flocculation.

The time is preferably determined depending upon the convenience for the production. However, if it is less than one hour, peptization is inadequate in many cases. After the pulverization, the peptization treatment under heating is preferably conducted in the presence of an alkali. However, it is also preferred that the alkali species used for the pulverization and peptization is removed by e.g. an ion exchange method, and then a weak base such as $NH_3$ is added to promote the stabilization of the sol. In such a case, the alkali species is preferably removed to a level of not higher than 100 ppm. If the alkali species after removal of the alkali exceeds 100 ppm, the stability of particles in the solution against the organic solvent may sometimes be impaired.

The compound of at least one member selected from the group consisting of Sn, In, Sb, Zn, Al and Ga, to be used in the present invention, is not particularly limited. It may be an oxide of such a member. More specifically, an oxide such as tin oxide, tin oxide having antimony substituted and solid-solubilized at the lattice position of tin, tin-doped indium oxide, alminum-doped zinc oxide, gallium-doped zinc oxide, may be pulverized and peptized.

Such an oxide is known as an electron conductive oxide due to a different element doped in the oxide or due to the lattice defect. By incorporating such a substance, it is possible to improve the electrical conductivity or the antistatic property. As oxides other than those described above, titanium oxide, ruthenium oxide, nickel oxide, cobalt oxide and iron oxide may, for example, be mentioned.

The present invention provides a colored thin film formed by using the above-described coating solution, and it further provides a multi-layer colored thin film which is a multi-layer film formed on a substrate, wherein at least one layer is the above-mentioned colored thin film.

The nitrogen-containing oxide such as the titanium oxide nitride, has electrical conductivity by itself. Accordingly, when it constitutes an antistatic film, it functions as an electrical conductivity-assisting component.

In the case of a colored antistatic film, the content of the nitrogen-containing oxide in the coated film is preferably from 1 to 80 wt %. If the content of the nitrogen-containing oxide is too small, the coloring performance tends to be inadequate, and if it is too larger the antistatic performance and the transmittance of the film tend to deteriorate, such being undesirable.

In the present invention, the compound of at least one member selected from the group consisting of Sn, In, Sb, Zn, Al and Ga, preferably has a particle size (primary particle size) of from 5 to 200 nm. If the particle size is smaller than this range, the contact resistance among the particles tends to increase, whereby they tend to fail to properly function as conductive particles, and if the particles are larger than this range, the surface roughness of the film tends to be too high, and it tends to be difficult to obtain a desired low reflection characteristic when a double layer colored antistatic film is formed.

The compound of the formula $Si(OR)_mR_n$ (wherein m+n=4, m=1 to 4, n=0 to 3, and R=$C_1$–$C_4$ alkyl group) to be used in the present invention, is not particularly limited, and a hydrolyzate or colloidal particles of the alkoxide may be employed. As such an alkoxide, a compound of the formula $Si(OR)_4$ (wherein R=$C_1$–$C_4$ alkyl group) is preferred. The colloidal particles are preferably particles having a particle size of from 5 to 200 nm.

In the present invention, when a single layer colored thin film or colored antistatic film containing an air layer (refractive index=1.0) in the film, is formed by constituting the film having a concave-convex structure (i.e. a surface-roughened structure) with the compound of at least one member selected from the group consisting of Sn, In, Sb, Zn, Al and Ga, the nitrogen-containing oxide and $SiO_2$, the mixed refractive index comprising the refractive index by the constituting materials of the film and the refractive index of the air layer, will be the apparent refractive index of the entire film, whereby the low reflection property can be obtained.

The film thickness is properly determined taking the strength, the colored degree, etc. into consideration. If the film thickness is too thick, various properties tend to be poor. Therefore, the thickness is preferably at most 0.5 μm.

Further, in order to obtain low reflectance by utilizing the optical properties of a thin film with a multi-layer film comprising two or more layers, a film thickness as an optical film thickness is required.

Generally, the optical performance of a thin film is determined by the refractive index and the thickness of the film. Here, when a thin film having a refractive index n is formed on a substrate having a constant refractive index $n_s$, and a light with a wavelength λ enters from a solute having a refractive index $n_0$, the energy reflectance R takes the minimum value when the phase difference Δ at the time when the light passes through the film, is $Δ=(2m+1)π$ i.e. when the phase difference Δ is an odd number of times of the half wavelength, where $Δ=4πnd/λ$ (where d: film thickness). Here, $$R=((n_2-n_0n_s)/(n_2+n_0n_s))^2 \quad (1)$$

to meet the nonreflection condition, R=0 in the equation (1), and the following equation (2) is required to be satisfied:

$$n=(n_0n_s)^{1/2} \quad (2)$$

If the equation (2) is expanded to a double layer structure, it will be the following equation (3):

$$n_sn_1^2=n_2^2n_0 \quad (3)$$

where $n_1$ is the refractive index of the layer on the medium side, and $n_2$ is the refractive index of the layer on the substrate side.

Here, when $n_0$=1 (air) and $n_s$=1.52 (glass) are applied to the equation (3), $n_2/n_1$=1.23, whereby the maximum low reflectance of the double layer film is obtainable. Of course, even if $n_2/n_1$=1.23 is not satisfied, low reflectance can be obtained so long as the refractive indices of the double layer film take a value close thereto. Accordingly, the ratio of the refractive indices of the two layers i.e. a high refractive index layer provided on the substrate side and a low refractive index layer provided on the medium side, is preferably selected to be a value as close as possible to 1.23.

With a double layer low reflection film of the present invention, the refractive index of the second layer film is preferably at most 1.5 from the above reason. If the refractive index is higher than this limit, no adequate low reflectance will be obtained. However, in the case of a double layer low reflection film, if the reflectance of a wavelength of 555 nm is reduced to improve the low reflection property, the reflectance of the wavelength near the ultraviolet region (380 nm) or the reflectance of a wavelength near the infrared region (780 nm) increases than the reflectance (4.5%) of the non-treated glass, whereby there will be a drawback that the entire film tends to be colored purple, although the low reflection property can be improved.

With respect to the reflection color, a strong color (such as dark purple) is not desired from the nature of the commercial product, and a pale color (such as pale blue) is preferred from the viewpoint of the appearance.

Further, in the case of surface treatment of a cathode ray tube, the reflection appearance is preferably blue rather than red.

In the present invention, a roughened structure (a concave-convex structure) is formed as a first layer on the substrate side, and a second layer is formed thereon so that it fills concaves and convexes of the first layer, to form a pseudo three layer structure, whereby the reflectance in the vicinity of the ultraviolet region and the infrared region is reduced as compared with the spectral curve which can be calculated by optical calculation of a double layer structure, and it is thereby possible to obtain a flat reflection spectral characteristic and improve the outer appearance. Further, by the penetration of the second layer into the first layer on the substrate side, a mutual anchoring effect is created between the two layers to improve the strength of the film.

As a construction of a multi-layer low reflection film having an antireflection property, a low reflection film having a high refractive index layer and a low refractive index layer formed sequentially from the substrate side in an optical thickness of λ/2 and λ/4, respectively, a three layer low reflection film having a medium refractive index layer, a high refractive index layer and a low refractive index layer sequentially formed from the substrate side in an optical thickness of λ/4, λ/2 and λ/4, respectively, and a four layer low reflection film having a low refractive index layer, a medium refractive index layer, a high refractive index layer and a low refractive index layer formed sequentially from the substrate side in an optical thickness of λ/4, λ/4, λ/2 and λ/4, respectively, are known as typical examples, where λ is the wavelength of the light desired to be prevented from reflection from the viewpoint of the optical design.

When a film having a surface-roughened structure (a concave-convex structure) is used in the present invention, the above-mentioned optical thin film of a two layer, three layer or four layer structure is preferably used as a pseudo three layer, four layer or five layer optical thin film.

The solution of the present invention comprises at least three components i.e. the nitrogen-containing oxide, the compound of the formula $Si(OR)_mR_n$ (wherein m+n=4, m=1 to 4, n=0 to 3 and R=$C_1$-$C_4$ alkyl group) or its hydrolyzate, and the compound of at least one member selected from the group consisting of Sn, In, Sb, Zn, Al and Ga, and it is preferred to add $NH_3$ to this solution, followed by heating.

Usually, surface hydroxyl groups are present on the surface of particles, particularly oxide particles. According to the present invention, an attention has been drawn to this point, and by providing counter ions to such surface hydroxyl groups, an electrical double layer is formed on the surface of the particles to prevent flocculation and precipitation of the particles, whereby it has been made possible to prepare a coating solution which is stable for a long period of time. Further, by such addition of counter ions, followed by heating the solution, individual particles tend to be close to a monodisperse state. Accordingly, when such a solution is coated, the structure of the coated film will be a roughened structure (a concave-convex structure) due to the monodisperse state of the particles, and the porosity of the film will be improved, and the apparent reflectance by the single layer film will be reduced to present low reflection. When one layer of a multi-layer film comprising two or more layers, is formed by the above film, the outer appearance will be improved, and the low reflection property will be obtained for the above-mentioned reason.

In the production of the present invention by heating in the presence of $NH_3$, $NH_3$ gives an influence not only over the nitrogen-containing oxide particles but also over the compound of the formula $Si(OR)_mR_n$ (wherein m+n=4, m=1 to 4, n=0 to 3 and R=$C_1$-$C_4$ alkyl group) or its hydrolyzate. In the present invention, the polycondensation reaction of the compound of the formula $Si(OR)_mR_n$ (wherein m+n=4, m=1 to 4, n=0 to 3 and R=$C_1$-$C_4$ alkyl group) is accelerated by heating in the presence of $NH_3$ to form a porous silicone compound in the solution. When such a solution is formed into a film, it is possible to improve the low reflection property and the outer appearance with a single layer film or a multi-layer film for the above-mentioned reason.

With respect to the concaves and convexes of the formed nitrogen-containing oxide film, the maximum difference between the concaves and the convexes is preferably at most 0.5 μm. If the maximum difference is larger than 0.5 μm, the haze tends to be high, and the low reflection property is likely to be impaired when a double layer film is formed.

The heating temperature is preferably from 30° to 80° C. If the temperature is lower than this range, polycondensation of the formula $Si(OR)_mR_n$ (wherein m+n=4, m=1 to 4, n=0 to 3 and $R=C_1-C_4$ alkyl group) or its hydrolyzate may not proceed sometimes. On the other hand, if the temperature is higher than this range, the polycondensation tends to proceed so much that the stability of the solution tends to be impaired. However, even at a low temperature, the polycondensation will naturally proceed as the time passes, but such is not industrially acceptable.

On the other hand, the nitrogen-containing oxide is relatively good in the heat resistance. However, when baked at a high temperature in an oxidizing atmosphere for a long period of time, it is partially oxidized and discolored, whereby the uniform absorption property at the visible light range tends to be impaired, and in some cases, no improvement in the contrast will be observed when a film is formed on a cathode ray tube.

In the present invention, it has been found that a Sn organic acid salt or a Co organic acid salt is effective for improving the oxidation resistance of the nitrogen-containing oxide. However, a tin salt of an organic acid such as stannous naphthenate or tin 2-ethylhexanoate, is readily hydrolizable, and when it is mixed with a solvent containing water, a precipitate will be formed. Therefore, to obtain a film having a good appearance, the solvent and the dispersing medium for the conductive oxide and the titanium oxide nitride particles are rather limited. Further, it is likely to react with moisture in air, whereby there has been a problem with respect to the stability of the coating solution. In the present invention, it has been found that the tin salt of an organic acid is stabilized by a β-diketone, whereby hydrolysis is suppressed, and the film properties will be improved, and the stability of the solution is improved.

As the organic acid salt to be used in the present invention, various compounds including acetic acid salts, tartaric acid salts, and carboxylic acid salts, may be used. However, from the viewpoint of the solubility and the effect for improving the oxidation resistance of the nitrogen-containing oxide, it is preferred to employ stannous naphthenate and/or tin 2-ethylhexanoate as a Sn organic acid salt, or cobaltous naphthenate and/or cobalt 2-ethylhexanoate as a Co organic acid salt. The content of the Sn organic salt or the Co organic salt in the solution is preferably within a range of from 1 to 60 wt %, relative to the solid content as calculated as $SnO_2$ or $Co_3O_4$, respectively. If the content is less than this range, the effects for improving the oxidation resistance of the titanium oxide nitride and the color tone tend to be poor. On the other hand, if the content exceeds the above range, the film strength tends to be low, such being undesirable.

The β-diketone to be used in the present invention may be of various types and is not particularly limited. However, acetylacetone is particularly preferred. Its content in the solution is preferably from 0.1 to 10 mols per mol of the Sn and/or Co organic acid salt. If the content is less than this range, no adequate contribution to the stability of the solution will be obtained. On the other hand, if the content exceeds the above range, the film strength tends to deteriorate, such being undesirable.

For coating the sol prepared by the above described method or the coating solution employing it, various methods may be employed such as a spin coating method, a dip coating method, a spray coating method, a roll coater method and a menniscus coater method. Among them, the spin coating method is excellent in the reproducibility and suitable for mass production, and thus it is preferably employed. By such a method, a film of a thickness of about 10 nm to 1 μm can be formed.

However, when a solution having particles dispersed in a liquid is spin-coated, there will be problems such as flow marks of the liquid or the flow marks of particles formed during the coating, flocculation of particles during drying of the film, non-uniformity in drying and non-uniformity of the color due to the color difference in the film thickness, and it is thereby difficult to form a film having a good appearance. Further, the wettability of the coating solution to the substrate and the susceptibility to the influence of the variation of the exterior atmosphere are influential over the productivity.

The present invention provides a coating solution which can be coated to provide a good appearance with little defects such as flow marks of the liquid, flow marks of particles, flocculation of particles during drying of the film, non-uniformity in drying and non-uniformity in the film thickness and which has good wettability to the substrate and is hardly susceptible to the influence of the exterior atmosphere.

The coating solution of the present invention preferably contains water, a $C_1-C_4$ lower alcohol, an ester ether, an ether alcohol and a ketone alcohol, whereby the total of the ester ether and the ether alcohol is preferably from 0.1 to 70 wt %, and the ketone alcohol is preferably from 0.1 to 30 wt %.

Further, it is preferred that the coating solution contains water, a $C_1-C_4$ lower alcohol, an ester ether, an ether alcohol and a polyhydric alcohol, whereby the total of the ester ether and the ether alcohol is preferably from 0.1 to 70 wt %, and the polyhydric alcohol is preferably from 0.1 to 30 wt %.

If the total amount of the ester ether and the ether alcohol is less than the above range, the amount of water and/or $C_1-C_4$ lower alcohol is increased. So, when the solution is spin-coated on e.g. a cathode ray tube, the viscosity of the solution tends to be too low to obtain a film having a uniform thickness. Further, if the total amount is larger than the above range, the evaporation speed of the solution tends to be slow, and aggregation of particles is likely to occur during evaporation of the solvent.

If the ketone alcohol and the polyhydric alcohol are less than the respective amounts, the evaporation rate of the solvent tends to be too fast, whereby the film tends to be non-uniform. On the other hand, if they exceeds the respective amounts, the evaporation rate of the solvent tends to be slow, and the viscosity of the solution increases, whereby flow marks of the liquid and flow marks of the particles are likely to form, and the film strength tends to deteriorate, such being undesirable.

The ester ether and the ketone alcohol in the coating solution are not particularly limited. Such an ester ether may, for example, be acetic acid ethylene glycol monomethyl ether (ethylene glycol monomethyl ether acetate), acetic acid ethylene glycol monoethyl ether, acetic acid ethylene glycol monobutyl ether, acetic acid diethylene glycol monomethyl ether, acetic acid diethylene glycol monoethyl ether, acetic acid diethylene glycol monobutyl ether, acetic acid propylene glycol monomethyl ether, acetic acid propylene glycol monoethyl ether, acetic acid propylene glycol monobutyl ether, acetic acid diglycol diacetate or trimethoxy glycol acetate. Among them, acetic acid propylene glycol monomethyl ether is particularly preferred. The ketone alcohol may, for example, be acetonitrile methanol, diacetone alcohol, dihydroxyl acetone or pyruvic alcohol. Among them, diacetone alcohol is particularly preferred.

As the polyhydric alcohol, a diol having a low boiling point is preferred. Such a diol may, for example, be ethylene glycol, 1,2-propylene glycol, 1,3-propylene glycol, 1,2-butylene glycol, 1,3-butylene glycol, 1,4-butylene glycol, 2,3-butylene glycol, hexylene glycol, pentadiol-2,4, hexanediol-2,5, heptanediol-2,4, 2-ethyl-1,3-hexanediol or diethylene glycol.

In the present invention, after forming the coating film, heating and/or irradiation of ultraviolet rays is applied to provide practical strength. The temperature for heating is not particularly limited, but is preferably within a range of from 160° C. to 500° C. which is the softening temperature of glass. With respect to the ultraviolet rays, ultraviolet rays with the main wavelength of 254 nm or with the main wavelength of 365 nm are preferred, since they have a high level of energy and are capable of accelerating decomposition of organic substances, and thus they are highly effective for curing the film.

In the colored thin film, the colored antistatic film or the colored low reflection antistatic film of the present invention, a nitrogen-containing oxide such as titanium oxide containing nitrogen, is used as a coloring component, whereby the formed film is excellent in the heat stability and weather resistance with respect to the coloring performance. Further, the film shows no absorption at any specific visible light wavelength, whereby when such a film is applied to a cathode ray tube, it is possible to improve the contrast without disturbing the balance of spectra emitted by phosphors in the cathode ray tube.

Further, the low reflection property will also be improved due to the uniform absorption over the entire visible light range.

Further, by adding a hydrolyzate of $Si(OR)_mR_n$ (wherein m+n=4, m=1 to 4, n=0 to 3 and R=$C_1$–$C_4$ alkyl group) to the above titanium oxide nitride, the stability of particles in the solution will be improved, and it is thereby possible to obtain a coating solution useful under a wide range of coating conditions without undergoing flocculation or precipitation even when it is diluted with an organic solvent consisting of at least one member selected from the group consisting of aliphatic hydrocarbons, aromatic hydrocarbons, halogenated hydrocarbons, alcohols, ketones, ethers, esters, alcohol esters, ketone esters, ether alcohols, ketone ethers and ester ethers.

By adding a compound of at least one element selected from the group consisting of Sn, In, Sb, Zn, Al and Ga to the above coating solution, it is possible to obtain a coating solution for a colored antistatic film having an antistatic property while maintaining the above-mentioned coloring performance.

According to the present invention, the optimum ranges are prescribed for the amount of alkali at the time of pulverizing particles and the type and the average particle size of the beads to be used for the pulverization, whereby it has been made possible to pulverize and peptize a nitrogen-containing oxide, which has been heretofore impossible. Further, at least two types of powders among oxides and nitrogen-containing oxides are subjected to unitary pulverization and peptization from the initial step of pulverization thereby to suppress compression breakage of electrical double layers between different types of particles and to produce a sol having two or more different types of particles uniformly dispersed, and it is possible to obtain a coating solution containing such particles.

It is common that electrical double layers are formed on the surface of particles in a solvent due to equipotential points specific to the particles. When another type of particles are incorporated to a sol solution having one type of particles dispersed therein, the initial electrical double layers are necessarily compressed, whereby a flocculating action will result due to van del Waals force.

In the present invention, a powder comprising oxides and nitrogen-containing oxides is subjected to unitary pulverization and peptization from the beginning of pulverization, whereby electrical double layers are believed to be formed on the respective particle surfaces so that two or more different types of particles can be stably present during the pulverization and peptization, and uniform dispersion of two or more different types of particles has been made possible.

According to the present invention, $NH_4^+$ counter ions are provided to the surface hydroxyl groups on the surface of particles in the above coating solution, so that electrical double layers are formed on the particle surfaces, whereby flocculation and precipitation of the particles are prevented, and it has been made possible to prepare a coating solution which is stable for a long period of time.

Further, by heating the solution after the addition of such counter ions, the individual particles tend to be close to a monodisperse state, and the polycondensation reaction of the compound of the formula $Si(OR)_mR_n$ (wherein m+n=4, m=1 to 4, n=0 to 3 and R=$C_1$–$C_4$ alkyl group) is accelerated, whereby a porous silicone compound will be formed in the solution. When this solution is coated, the structure of the coated film will be a toughened structure (a concave-convex structure) due to the monodisperse state of particles and the porous silicone compound, and the porosity of the film will be improved, whereby the apparent reflectance of the single layer film is reduced to present low reflection.

Further, in the double layer colored low reflection antistatic film, the second layer formed on the first layer on the substrate side penetrates into the first layer due to the roughened structure (the concave-convex structure) of the first layer, whereby a pseudo three layer structure is formed. It is thereby possible to obtain a flat reflection spectral property with the reflectance reduced in the vicinity of the ultraviolet region and the infrared region as compared with the spectral curve which can be calculated by the optical calculation of the double layer structure, whereby the outer appearance can be improved.

Further, by the penetration of the second layer into the first layer on the substrate side, the mutual anchoring effect is created between the two layers, whereby the film strength can be improved.

By incorporating from 0.1 to 70 wt % in total of an ester ether and an ether alcohol and from 0.1 to 30 wt % of a ketone alcohol to the coating solution of the present invention, or by incorporating from 0.1 to 70 wt % in total of an ether alcohol and an ester alcohol and from 0.1 to 30 wt % of a polyhydric alcohol to the coating solution, it is possible to control e.g. the surface tension, the viscosity, the evaporation rate, etc. of the coating solution and to obtain a coating solution which can readily be coated on a large scale display with a large area and which can be coated to provide a good appearance with little defects such as flow marks of the liquid, flow marks of particles, flocculation of particles during the drying of the film, nonuniformity in drying and nonuniformity in the film thickness.

Now, the coating solution of the present invention and the film obtained by coating the coating solution will be described in detail with reference to Examples. However, it should be understood that the present invention is by no means restricted to such specific Examples. The coating solutions and the films were evaluated as follows.

1) Evaluation of dispersion stability of particles in a solution

The average particle size of particles in the solution was measured immediately after the preparation of the solution and after being stored to stand still at 5° C. for 4 weeks, by a laser particle size analyzing system LPA-3100, manufactured by Otsuka Denshi.

2) Evaluation of decrease of the transmittance

The reduction ratio of the transmittance of glass provided with a coated film was measured by a spectrophotometer U-3500 manufactured by Hitachi Corporation, as compared with the transmittance of non-treated glass being 100% at 380 nm, 550 nm and 780 nm.

3) Evaluation of haze

The haze of the film itself was measured by a direct reading type haze computer manufactured by Suga Shikenki.

4) Evaluation of electrical conductivity

The surface resistance of the film surface was measured by a Hyresta resistance measuring apparatus manufactured by Mitsubishi Petrochemical Co., Ltd. in an atmosphere with a relative humidity of at most 30%. However, the measurement was carried out only with respect to films having antistatic properties.

5) Scratch resistance

Under a load of 1 kg, a rubber eraser was reciprocated 50 times on the film surface, whereupon the scratching on the surface was visually observed. The evaluation standards were as follows.

○: No scratching

Δ: Some scratching

X: Many scratch marks observed, or the film peeled

6) Pencil hardness

The film surface was scratched with a pencil under a load of 1 kg, whereby the hardness of the pencil when a scratch mark was started to be visually observed on the surface, was taken as the pencil hardness of the film.

7) Luminous reflectance and spectral reflectance

The luminous reflectance of a film of from 380 nm to 700 nm and the spectral reflectance at 380 nm, 550 nm and 780 nm were measured by a GAMMA spectral reflectance spectrum measuring apparatus.

8) Color of the reflected light

With respect to a colored low reflection film and a colored low reflection antistatic film, the film surface was irradiated with a fluorescent lamp, and the reflected light was visually evaluated.

9) Surface condition of the coated film

The surface condition of the film after coating was visually evaluated.

EXAMPLE 1

20 g of titanium oxide nitride ($TiO_x$ ($1.0 \leq x < 2$) containing 2 wt % of nitrogen) and 1 g of potassium hydroxide were added to 50 cc of distilled water, and the mixture was introduced into a sand mill having a capacity of 170 cc together with quartz beads having an average particle size of 0.1 mm, whereupon pulverization treatment was conducted for one hour. Then, distilled water was further added to dilute the mixture to a solid content of 4.0 wt % as calculated as oxides, and then heating and peptidizing treatment was conducted at a liquid temperature of 70° C. for one hour. To this liquid, 50 g of an ion exchange resin (SK1B, manufactured by Mitsubishi Kasei Corporation) was further added, and the mixture was mixed and stirred for one hour to reduce the potassium ion concentration to 10 ppm. Further, $NH_3$ was added to adjust the pH of the solution to 7, and the solid content was adjusted to 20 wt % by an ultraconcentration apparatus. The solution was further diluted with ethanol to a solid content of 5 wt % (solution $A^1$).

$Ti(OPr)_2(acac)_2$ was dissolved in ethanol so that the solid content would be 10 wt %. Then, water (an aqueous solution acidified with hydrochloric acid to pH6) was added in an amount of 8 mols per mol of $Ti(OPr)_2(acac)_2$, and the mixture was stirred at room temperature for 24 hours. Then, this solution was diluted with ethanol to a solid content of 5 wt % (solution $A^2$). Solution $A^1$ and solution $A^2$ were mixed in a weight ratio of solution $A^1$:solution $A^2$=8:2, and then the mixture was diluted with a mixed organic solvent comprising ethanol, butanol, ethylene glycol monomethyl ether and diacetone alcohol (weight ratio of ethanol:butanol:ethylene glycol monomethyl ether:diacetone alcohol=5:3:60:20) to a solid content of 1.2 wt % to obtain a coating solution for a colored film.

EXAMPLE 2

20 g of $Cr_2O_{3-x}$ ($0<x<3$) containing 2 wt % of nitrogen and 1 g of sodium hydroxide were added to 50 cc of distilled water, and the mixture was introduced into a sand mill container having a capacity of 170 cc together with quartz beads having an average particle size of 0.1 mm, whereupon pulverization treatment was conducted for one hour. Then, distilled water was further added to dilute the mixture to a solid content of 4.0 wt % as calculated as oxides. Then, heating and peptidizing treatment was conducted at a liquid temperature of 90° C. for two hours. Further, 50 g of an ion exchange resin (SK1B, manufactured by Mitsubishi Kasei Corporation) was added to this solution, and the mixture was mixed and stirred for one hour to reduce the sodium ion concentration to 70 ppm. Further, $NH_3$ was added to adjust the pH of the solution to 7, and the solid content was adjusted to 20 wt % by an ultraconcentration apparatus. The solution was further diluted with ethanol to a solid content of 5 wt % (solution B).

To an ethanol solution of $Si(OEt)_4$ (solid content: 10 wt % as calculated as oxides), water (an aqueous water acidified with nitric acid to pH6.5) was added in an amount of 8 mols per mol of $Si(OEt)_4$, and the mixture was refluxed under heating at 80° C. for two hours. Further, the mixture was diluted with ethanol to a solid content of 5 wt % (solution $C^1$).

Solution $A^2$, solution B and solution $C^1$ were mixed in a weight ratio of solution $A^2$:solution B: solution $C^1$=3:5:2, and then the mixture was diluted with a mixed organic solvent comprising ethanol, butanol, propylene glycol monomethyl ether acetate and diacetone alcohol (weight ratio of ethanol:butanol:propylene glycol monomethyl ether acetate:diacetone alcohol= 15:13:60:20) to a solid content of 1.2 wt % to obtain a coating solution for a colored film.

EXAMPLE 3

Solution $A^1$ and solution $C^1$ were mixed in a weight ratio of solution $A^1$:solution $C^1$=2:3, and the mixture was diluted with a mixed organic solvent comprising ethanol, propylene glycol monomethyl ether, 2,3-butylene glycol (weight ratio of ethanol:propylene glycol monomethyl ether:2,3-butyleneglycol=5.3:71.6:20) to a solid content of 1.2 wt %.

EXAMPLE 4

14 g of titanium oxide nitride (TiO$_x$ (1.0≦x<2) containing 2 wt % of nitrogen), 6 g of tin oxide having 15 wt % of antimony doped thereto and 1 g of potassium hydroxide were added to 50 cc of distilled water, and this mixture was introduced into a sand mill container together with quartz beads with a particle size of 0.1 mm, and pulverization treatment was conducted for one hour. Then, distilled water was further added to dilute the solution to a solid content of 4.0 wt % as calculated as oxides. Then, heating and peptidizing treatment was conducted at a liquid temperature of 70° C. for one hour. Further, to this solution, 70 g of an ion exchange resin (SK1B, manufactured by Mitsubishi Kasei Corporation) was added, and the mixture was mixed and stirred for one hour to reduce the potassium ion concentration to 18 ppm. Further, NH$_3$ was added to adjust the pH of the solution to 7.5, and the solid content was adjusted to 20 wt % by an ultraconcentration apparatus. Further, the solution was diluted with ethanol to a solid content of 5 wt % (solution D).

Solution D and solution C$^1$ were mixed in a weight ratio of solution D:solution C$^1$=8:2, and the mixture was diluted with a mixed solvent in a weight ratio of ethanol:propylene glycol monomethyl ether:2,3-butyleneglycol=5.3:71.6:20 to a solid content of 1.2 wt % to obtain a coating solution for a colored antistatic film.

EXAMPLE 5

8 g of titanium oxide nitride (TiO$_x$ (1.0≦x<2) containing 2 wt % of nitrogen), 8 g of zinc oxide having 5 wt % of aluminum doped thereto and 1 g of potassium hydroxide were added to 50 cc of distilled water, and the mixture was introduced into a sand mill container having a capacity of 170 cc together with quartz beads having an average particle size of 0.1 mm, and pulverization treatment was conducted for one hour. Then, distilled water was further added to dilute the solution to a solid content of 5.0 wt % as calculated as oxides (solution E).

Solution E and solution C$^1$ were mixed in a weight ratio of solution E:solution C$^1$=9:1, and the mixture was diluted with a mixed solvent in a weight ratio of ethanol:propylene glycol monomethyl ether:2,3-butyleneglycol=5.3:71.6:20 to a solid content of 1.2 wt % to obtain a coating solution for a colored antistatic film.

EXAMPLE 6

14 g of titanium oxide nitride (TiO$_x$ (1.0≦x<2) containing 10 wt % of nitrogen), 6 g of zinc oxide having 8 wt % of gallium doped thereto and 1 g of potassium hydroxide were added to 50 cc of distilled water, and the mixture was introduced into a sand mill container having a capacity of 170 cc together with quartz beads having an average particle size of 0.1 mm, and pulverization treatment was conducted for one hour. Then, distilled water was further added to dilute the solution to a solid content of 4.0 wt % as calculated as oxides. Then, heating and peptidizing treatment was conducted at liquid temperature of 70° C. for one hour. Further, to this solution, 70 g of an ion exchange resin (SK1B, manufactured by Mitsubishi Kasei Corporation) was added, and the mixture was mixed and stirred for one hour to reduce the potassium ion concentration to 18 ppm. Further, NH$_3$ was added to adjust the pH of the solution to 7.5, and the solid content was adjusted to 20 wt % by an ultraconcentration apparatus. Further, the solution was diluted with ethanol to a solid content of 5 wt % (solution F).

Solution F and solution C$^1$ were mixed in a weight ratio of solution F:solution C$^1$=5:5, and the mixture was diluted with a mixed solvent in a weight ratio of ethanol:propylene glycol monomethyl ether:2,3-butyleneglycol=5.3:71.6:20 to a solid content of 1.2 wt % to obtain a coating solution for a colored antistatic film.

EXAMPLE 7

10 g of titanium oxide nitride (TiO$_x$ (1.0≦x<2) containing 10 wt % of nitrogen), 10 g of ITO powder (Sn/In molar ratio=10/90, primary particle size: 300 Å) and 1 g of lithium hydroxide were added to 50 cc of distilled water, and the mixture was introduced into a sand mill container having a capacity of 170 cc together with quartz beads having an average particle size of 0.1 mm, and pulverization treatment was conducted fox one hour. Then, distilled water was further added to dilute the solution to a solid content of 4.0 wt % as calculated as oxides. Then, heating and peptidizing treatment was conducted at a liquid temperature of 70° C. for one hour. Further, to this solution, 70 g of an ion exchange resin (SK1B, manufactured by Mitsubishi Kasei Corporation) was added, and the mixture was mixed and stirred for one hour to reduce the lithium ion concentration to 25 ppm. Further, NH$_3$ was added to adjust the pH of the solution to 7.5, and the solid content was adjusted to 20 wt % by an ultraconcentration apparatus. Further, the solution was diluted with ethanol to a solid content of 5 wt % (solution G).

Solution G and solution C$^1$ were mixed in a weight ratio of solution G:solution C$^1$=5:5, and the mixture was diluted with a mixed solvent in a weight ratio of ethanol:propylene glycol monomethyl ether:2,3-butyleneglycol=5.3:71.6:20 to a solid content of 1.2 wt % to obtain a coating solution for a colored antistatic film.

EXAMPLE 8

20 g of tin oxide having 15 wt % of antimony doped thereto and 1 g of potassium hydroxide were added to 50 cc of distilled water, and the mixture was introduced into a sand mill container having a capacity of 170 cc together with quartz beads having an average particle size of 0.1 mm, and pulverization treatment was conducted for one hour. Then, distilled water was further added to dilute the solution to a solid content of 3.5 wt % as calculated as oxides. Then, heating and peptidizing treatment was conducted at a liquid temperature of 90° C. for one hour. Further, to 300 cc of this solution, 50 g of an ion exchange resin (SK1B, manufactured by Mitsubishi Kasei Corporation) was added, and alkali removal treatment was conducted. The solid content was concentrated to 25 wt %, and then the solution was diluted with ethanol to a solid content of 5 wt % (solution H).

Solution A$^1$, solution C$^1$ and solution H were mixed in a weight ratio of solution A$^1$:solution C$^1$:solution H=5:3:2, and the mixture was diluted with a mixed solvent in a weight ratio of isopropyl alcohol (IPA):propylene glycol monomethyl ether acetate:2-ethoxyethanol:diacetone alcohol= 40:30:20:10 to a solid content of 1.2 wt % to obtain a coating solution for a colored antistatic film.

EXAMPLE 9

Solution A$^1$, solution C$^1$ and solution H were mixed in a weight ratio of solution A$^1$:solution C$^1$:solution H=5:3:2, and heat treatment was conducted at a temperature of 60° C. for one hour. Then, the solution was diluted with a mixed solvent in a weight ratio of IPA:propylene glycol monomethyl ether acetate:2-ethoxyethanol:diacetone alcohol= 40:30:20:10 to a solid content of 1.2 wt % to obtain a coating solution for a colored antistatic film.

EXAMPLE 10

Tin 2-ethylhexanoate was diluted with a solvent in a weight ratio of ethanol:acetyl acetone=100:10 to a solid content of 5 wt % as calculated as oxides (solution I) Solution $A^1$, solution $C^1$ and solution I were mixed in a weight ratio of solution $A^1$:solution $C^1$:solution I=65:20:15, and heat treatment was conducted at 40° C. for 20 minutes. Then, the solution was diluted with a solvent in a weight ratio of water:ethanol:propylene glycol=5.3:22.5:38 to a solid content of 1.2 wt % to obtain a coating solution for a colored antistatic film.

EXAMPLE 11

The operation was conducted in the same manner as in Example 10 except that solution $A^1$, solution $C^1$ and solution I in Example 10 were mixed in a weight ratio of solution $A^1$:solution $C^1$:solution I=55:30:15, to obtain a coating solution for a colored antistatic film.

EXAMPLE 12

Cobalt 2-ethylhexanoate was diluted with a solvent in a weight ratio of ethanol:acetylacetone=100:10 to a solid content of 5 wt % as calculated as oxide (solution J) Solution $A^1$, solution $C^1$, solution H and solution J were mixed in a weight ratio of solution $A^1$:solution $C^1$:solution H:solution J=40:15:30:15, and heat treatment was conducted at 40° C. for 20 minutes. Then, the solution was diluted with a solvent in a mixed solvent in a weight ratio of water:ethanol:propylene glycol monomethyl ether acetate:IPA:diacetone alcohol=5.3:22.5:38:23:10 to a solid content of 1.2 wt % to obtain a coating solution for a colored antistatic film.

EXAMPLE 13

20 g of tin oxide having 15 wt % of antimony doped thereto and 1 g of potassium hydroxide were added to 50 cc of distilled water, and the mixture was introduced into a sand mill container having a capacity of 170 cc together with quartz beads having an average particle size of 0.1 mm, and pulverization treatment was conducted for one hour. Then, distilled water was further added to dilute the solution to a solid content of 3.5 wt % as calculated as oxides. Then, heating and peptidizing treatment was conducted at a liquid temperature of 90° C. for one hour. Further, to this solution, 50 g of an ion exchange resin (SKlB, manufactured by Mitsubishi Kasei Corporation) was added, and alkali removal treatment was conducted. Further, $NH_3$ was added to adjust the pH of the solution to 6.5, and the solution was concentrated to a solid content of 20 wt %. Then, the solution was diluted with ethanol to a solid content of 5 wt % (solution K).

Solution $A^1$, solution $C^1$ and solution K were mixed in a weight ratio of solution $A^1$:solution $C^1$:solution K=5:3:2, and heat treatment was conducted at a temperature of 50° C. for two hours. Then, the solution was diluted with a mixed solvent in a weight ratio of IPA:propylene glycol monomethyl ether acetate:2-ethoxyethanol:diacetone alcohol= 40:30:20:10 to a solid content of 1.2 wt % to obtain a coating solution for a colored antistatic film.

EXAMPLE 14

Indium nitrate was dissolved in acetylacetone so that the solid content would be 10 wt % as calculated as oxide, and refluxing was conducted at 130° C. for one hour (solution L). Stannous chloride was dissolved in acetylacetone so that the solid content would be 10 wt % as calculated as oxide, and heating and refluxing were conducted at 130° C. for two hours (solution M). Solution L and solution M were diluted with ethanol to the respective solid contents of 5 wt % as calculated as the respective oxides, and then they were mixed in a weight ratio of solution L:solution M=85:15 (solution N).

Solution $A^1$, Solution $C^1$ and solution N were mixed in a weight ratio of solution $A^1$:solution $C^1$:solution N=5:2:3, and then, the mixture was diluted with a mixed solvent in a weight ratio of ethanol:acetylacetone:ethyl cellosolve:IPA:diacetone alcohol=5.3:18.2:32:23:20 to a solid content of 1.2 wt % to obtain a coating solution for a colored antistatic film.

EXAMPLE 15

25 g of titanium oxide nitride ($TiO_x$ ($1.0 \leq x < 2$) containing 10 wt % of nitrogen) and 6 g of a surfactant (sodium dodecylbenzene sulfonate) were added to 100 cc of distilled water, and pulverization treatment was conducted for one hour by a homogenizer. Further, dispersion was conducted for 20 hours by a supersonic dispersing machine. Distilled water was added thereto to a solid content of 10.0 wt % as calculated as oxides, and then further diluted with ethanol to a solid content of 5 wt % (solution $O^1$).

$Zr(OBu)_2(acac)_2$ was dissolved in ethanol so that the solid content would be 10 wt %. Then, water (an aqueous solution acidified by hydrochloric acid to pH6) was added in an amount of 8 mols per mol of $Zr(OBu)_2(acac)_2$, and the mixture was stirred at room temperature for 24 hours. Then, this solution was diluted with ethanol to a solid content of 5 wt % (solution $O^2$).

Solution $O^1$ and solution $O^2$ were mixed in a weight ratio of solution $O^1$:solution $O^2$=8:2, and the mixture was diluted with a mixed organic solvent comprising ethanol, ethylene glycol monomethyl ether and diacetone alcohol (weight ratio of ethanol:ethylene glycol monomethyl ether:diacetone alcohol=70:30:10) to a solid content of 1.2 wt % to obtain a coating solution for a colored film.

EXAMPLE 16

$Al(acac)_3$ was dissolved in toluene so that the solid content would be 2.5 wt %, and then diluted with ethanol to a solid content of 1.2 wt % (solution Q). Solution $O^1$ was diluted with ethanol to a solid content of 1.2 wt % (solution R). Solution R and solution Q were mixed in a weight ratio of solution R:solution Q=8:2 to obtain a coating solution for a colored film.

COMPARATIVE EXAMPLES

Comparative Example 1

0.02 g of copper phthalocyanine blue was added to 40 g of solution $C^1$, and the mixture was diluted with a mixed organic solvent comprising ethanol and butanol (weight ratio of ethanol:butanol=3:2) to a solid content of 1.4 wt % as calculated as oxide to obtain a coating solution.

Comparative Example 2

25 g of black iron oxide and 6 g of a surfactant (sodium dodecylbenzene sulfonate) were added to 100 cc of distilled water, and pulverization treatment was conducted for one hour by a homogenizer. Further, dispersion was conducted for 20 hours by a supersonic dispersing machine. Distilled water was added thereto to dilute the solution to a solid content of 10.0 wt % as calculated as oxides, and then further diluted with ethanol to a solid content of 5 wt % (solution $T^1$).

Solution $T^1$ and solution $C^1$ were mixed in a weight ratio of solution $T^1$:solution $C^1$=8:2. Then, the mixture was diluted with a mixed organic solvent comprising ethanol, butanol, propylene glycol monomethyl ether acetate and diacetone alcohol (weight ratio of ethanol:butanol:propylene glycol monomethyl ether acetate:diacetone alcohol= 15:13:60:20) to a solid content of 1.2 wt % to obtain a coating solution.

Comparative Example 3

20 g of tricobalt tetraoxide and 1 g of potassium hydroxide were added to 50 cc of distilled water, and the mixture was introduced into a sand mill container having a capacity of 170 cc together with quartz beads having an average particle size of 0.1 mm, and pulverization treatment was conducted for one hour. Then, distilled water was further added to dilute the solution to a solid content of 4.0 wt % as calculated as oxides. Then, heating and peptidizing treatment was conducted at a liquid temperature of 70° C. for one hour. Further, to this solution, 50 g of an ion exchange resin (SK1B, manufactured by Mitsubishi Kasei Corporation) was added, and the mixture was mixed and stirred for one hour to reduce the potassium ion concentration to 10 ppm. Further, $NH_3$ was added to adjust the pH of the solution to 7, and the solid content was adjusted to 20 wt % by an ultraconcentration apparatus. Further, the solution was diluted with ethanol to a solid content of 5 wt % (solution $T^2$). Solution $T^2$ and solution $C^1$ were mixed in a weight ratio of solution $T^2$:solution $C^1$=8:2, and the mixture was diluted with a mixed organic solvent comprising ethanol, butanol, propylene glycol monomethyl ether acetate and diacetone alcohol (weight ratio of ethanol:butanol:propylene glycol monomethyl ether acetate:diacetone alcohol= 15:13:60:20) to a solid content of 1.2 wt % to obtain a coating solution.

Comparative Example 4

Solution H and solution $C^1$ were mixed in a weight ratio of solution H:solution $C^1$=5:5 (solution $T^3$). 0.02 g of copper phthalocyanine blue was added to 40 g of solution $T^3$, and the mixture was diluted with a mixed solvent in a weight ratio of IPA:propylene glycol monomethyl ether acetate:2-ethoxyethanol:diacetone alcohol=40:30:20:10 to a solid content of 1.2 wt % as calculated as oxides to obtain a coating solution for a colored antistatic film.

Comparative Example 5

Solution $C^1$ and solution H were mixed in a weight ratio of solution $C^1$:solution H=5:5, and then the mixture was diluted with a mixed solvent in a weight ratio of IPA:propylene glycol monomethyl ether acetate:2-ethoxyethanol:diacetone alcohol=40:30:20:10 to a solid content of 1.2 wt % to obtain a coating solution.

EXAMPLE 17

The coating solution for a colored film obtained in Example 1 was coated on the surface of a face panel of a cathode ray tube for 60 seconds at a rotational speed of 100 rpm and then heated at 250° C. for 30 minutes to obtain a film having a thickness of about 100 nm.

EXAMPLE 18

The coating solution for a colored film obtained in Example 2 was coated on the surface of a face panel of a cathode ray tube for 60 seconds at a rotational speed of 100 rpm and then heated at 250° C. for 30 minutes to obtain a film having a thickness of about 90 nm.

EXAMPLE 19

The coating solution for a colored antistatic film obtained in Example 3 was coated on the surface of a face panel of a cathode ray tube for 60 seconds at a rotational speed of 100 rpm and then heated at 160° C. for 30 minutes to obtain a film having a thickness of about 100 nm.

EXAMPLE 20

The coating solution for a colored antistatic film obtained in Example 4 was coated on the surface of a face panel of a cathode ray tube for 60 seconds at a rotational speed of 100 rpm and then heated at 200° C. for 30 minutes to obtain a film having a thickness of about 100 nm.

EXAMPLE 21

The coating solution for a colored antistatic film obtained in Example 5 was coated on the surface of a face panel of a cathode ray tube for 60 seconds at a rotational speed of 100 rpm and then heated at 160° C. for 30 minutes to obtain a film having a thickness of about 90 nm.

EXAMPLE 22

The coating solution for a colored antistatic film obtained in Example 6 was coated on the surface of a face panel of a cathode ray tube for 60 seconds at a rotational speed of 100 rpm and then heated at 160° C. for 30 minutes to obtain a film having a thickness of about 140 nm.

EXAMPLE 23

The coating solution for a colored antistatic film obtained in Example 7 was coated on the surface of a face panel of a cathode ray tube for 60 seconds at a rotational speed of 100 rpm and then heated at 160° C. for 30 minutes to obtain a film having a thickness of about 80 nm.

EXAMPLE 24

The coating solution for a colored antistatic film obtained in Example 8 was coated on the surface of a face panel of a cathode ray tube for 60 seconds at a rotational speed of 100 rpm and then heated at 160° C. for 30 minutes to obtain a film having a thickness of about 90 nm.

EXAMPLE 25

The coating solution for a colored antistatic film obtained in Example 9 was coated on the surface of a face panel of a cathode ray tube for 60 seconds at a rotational speed of 100 rpm and then heated at 250° C. for 30 minutes to obtain a film having a thickness of about 100 nm.

EXAMPLE 26

The coating solution for a colored antistatic film obtained in Example 10 was coated on the surface of a face panel of a cathode ray tube for 60 seconds at a rotational speed of 100 rpm and then heated at 200° C. for 30 minutes to obtain a film having a thickness of about 140 nm.

EXAMPLE 27

The coating solution for a colored antistatic film obtained in Example 11 was coated on the surface of a face panel of a cathode ray tube for 60 seconds at a rotational speed of 100 rpm and then heated at 200° C. for 30 minutes to obtain a film having a thickness of about 120 nm.

EXAMPLE 28

The coating solution for a colored antistatic film obtained in Example 12 was coated on the surface of a face panel of a cathode ray tube for 60 seconds at a rotational speed of 100 rpm and then heated at 250° C. for 30 minutes to obtain a film having a thickness of about 130 nm.

EXAMPLE 29

The coating solution for a colored antistatic film obtained in Example 13 was coated on the surface of a face panel of a cathode ray tube for 60 seconds at a rotational speed of 100 rpm and then heated at 200° C. for 30 minutes to obtain a film having a thickness of about 90 nm.

EXAMPLE 30

The coating solution for a colored antistatic film obtained in Example 14 was coated on the surface of a face panel of a cathode ray tube for 60 seconds at a rotational speed of 100 rpm and then heated at 370° C. for 30 minutes to obtain a film having a thickness of about 120 nm.

EXAMPLE 31

The coating solution for a colored antistatic film obtained in Example 15 was coated on the surface of a face panel of a cathode ray tube for 60 seconds at a rotational speed of 100 rpm and then heated at 350° C. for 30 minutes to obtain a film having a thickness of about 180 nm.

EXAMPLE 32

The coating solution for a colored antistatic film obtained in Example 16 was coated on the surface of a face panel of a cathode ray tube for 60 seconds at a rotational speed of 100 rpm and then heated at 250° C. for 30 minutes to obtain a film having a thickness of about 340 nm.

Comparative Example 6

The coating solution obtained in Comparative Example 1 was coated on the surface of a face panel of a cathode ray tube for 60 seconds at a rotational speed of 100 rpm and then heated at 180° C. for 30 minutes to obtain a film having a thickness of about 140 nm.

Comparative Example 7

The coating solution obtained in Comparative Example 1 was coated on the surface of a face panel of a cathode ray tube for 60 seconds at a rotational speed of 100 rpm and then heated at 350° C. for 30 minutes to obtain a film having a thickness of about 120 nm.

Comparative Example 8

The coating solution obtained in Comparative Example 2 was coated on the surface of a face panel of a cathode ray tube for 60 seconds at a rotational speed of 100 rpm and then heated at 180° C. for 30 minutes to obtain a film having a thickness of about 320 nm.

Comparative Example 9

The coating solution obtained in Comparative Example 3 was coated on the surface of a face panel of a cathode ray tube for 60 seconds at a rotational speed of 100 rpm and then heated at 180° C. for 30 minutes to obtain a film having a thickness of about 150 nm.

Comparative Example 10

The coating solution obtained in Comparative Example 4 was coated on the surface of a face panel of a cathode ray tube for 60 seconds at a rotational speed of 100 rpm and then heated at 180° C. for 30 minutes to obtain a film having a thickness of about 130 nm.

Comparative Example 11

The coating solution obtained in Comparative Example 5 was coated on the surface of a face panel of a cathode ray tube for 60 seconds at a rotational speed of 100 rpm and then heated at 180° C. for 30 minutes to obtain a film having a thickness of about 90 nm.

EXAMPLE 33

To an ethanol solution of $Si(OEt)_4$ (solid content: 20 wt % as calculated as oxide), water (an aqueous solution acidified with hydrochloric acid to pH3.0) was added in an amount of 8 mols per mol of $Si(OEt)_4$, and the mixture was stirred at 80° C. for two hours and then diluted with a mixed solvent in a weight ratio of water:ethanol:propylene glycol monomethyl ether acetate:IPA:diacetone alcohol=5.3:22.5:38:23:10 to a solid content of 0.9 wt % (solution P).

The coating solution for a colored film obtained in Example 1 was coated on the surface of a face panel of a cathode ray tube for 60 seconds at a rotational speed of 100 rpm and then dried at 60° C. for 5 minutes. Then, solution P was coated thereon for 60 seconds at a rotational speed of 100 rpm and then heated at 180° C. for 30 minutes to obtain a low reflection colored film.

EXAMPLE 34

The coating solution for a colored film obtained in Example 2 was coated on the surface of a face panel of a cathode ray tube for 60 seconds at a rotational speed of 100 rpm and then heated at 250° C. for 5 minutes. Then, solution P was coated thereon for 60 seconds at a rotational speed of 100 rpm and then heated at 250° C. for 30 minutes to obtain a low reflection colored film.

EXAMPLE 35

The coating solution for a colored film obtained in Example 3 was coated on the surface of a face panel of a cathode ray tube for 60 seconds at a rotational speed of 100 rpm and then dried at 40° C. for 5 minutes. Then, solution P was coated thereon for 60 seconds at a rotational speed of 100 rpm and then heated at 200° C. for 30 minutes to obtain a low reflection colored film.

EXAMPLE 36

The coating solution for a colored antistatic film obtained in Example 4 was coated on the surface of a face panel of a cathode ray tube for 60 seconds at a rotational speed of 100 rpm and then irradiated with ultraviolet rays with the main wavelength of 254 nm for 10 minutes. Then, solution P was coated thereon for 60 seconds at a rotational speed of 100 rpm and then heated at 200° C. for 30 minutes to obtain a low reflection antistatic colored film.

EXAMPLE 37

The coating solution for a colored antistatic film obtained in Example 5 was coated on the surface of a face panel of a cathode ray tube for 60 seconds at a rotational speed of 100 rpm and then dried at 40° C. for one minute. Then, solution P was coated thereon for 60 seconds at a rotational speed of 100 rpm and then heated at 160° C. for 30 minutes to obtain a low reflection antistatic colored film.

EXAMPLE 38

The coating solution for a colored antistatic film obtained in Example 6 was coated on the surface of a face panel of a cathode ray tube for 60 seconds at a rotational speed of 100 rpm and then irradiated with ultraviolet rays with the main wavelength of 365 nm for 15 minutes. Then, solution P was coated thereon for 60 seconds at a rotational speed of 100 rpm and then heated at 180° C. for 30 minutes to obtain a low reflection antistatic colored film.

EXAMPLE 39

The coating solution for a colored antistatic film obtained in Example 7 was coated on the surface of a face panel of a cathode ray tube for 60 seconds at a rotational speed of 100 rpm and then dried at 50° C. for 10 minutes. Then, solution P was coated thereon for 60 seconds at a rotational speed of 100 rpm and then heated at 160° C. for 30 minutes to obtain a low reflection antistatic colored film.

EXAMPLE 40

The coating solution for a colored antistatic film obtained in Example 8 was coated on the surface of a face panel of a cathode ray tube for 60 seconds at a rotational speed of 100 rpm and then dried at 40° C. for 1 minute. Then, solution P was coated thereon for 60 seconds at a rotational speed of 100 rpm and then heated at 370° C. for 5 minutes to obtain a low reflection antistatic colored film.

EXAMPLE 41

The coating solution for a colored antistatic film obtained in Example 9 was coated on the surface of a face panel of a cathode ray tube for 60 seconds at a rotational speed of 100 rpm and then dried at 40° C. for 1 minute. Then, solution P was coated thereon for 60 seconds at a rotational speed of 100 rpm and then heated at 370° C. for 5 minutes to obtain a low reflection antistatic colored film.

EXAMPLE 42

The coating solution for a colored antistatic film obtained in Example 10 was coated on the surface of a face panel of a cathode ray tube for 60 seconds at a rotational speed of 100 rpm and then heated at 200° C. for 10 minutes. Then, solution P was coated thereon for 60 seconds at a rotational speed of 100 rpm and then heated at 370° C. for 5 minutes to obtain a low reflection antistatic colored film.

EXAMPLE 43

The coating solution for a colored antistatic film obtained in Example 11 was coated on the surface of a face panel of a cathode ray tube for 60 seconds at a rotational speed of 100 rpm and then heated at 220° C. for 10 minutes. Then, solution P was coated thereon for 60 seconds at a rotational speed of 100 rpm and then heated at 370° C. for 5 minutes to obtain a low reflection antistatic colored film.

EXAMPLE 44

The coating solution for a colored antistatic film obtained in Example 12 was coated on the surface of a face panel of a cathode ray tube for 60 seconds at a rotational speed of 100 rpm and then heated at 380° C. for 30 minutes. Then, solution P was coated thereon for 60 seconds at a rotational speed of 100 rpm and then heated at 450° C. for 30 minutes to obtain a low reflection antistatic colored film.

EXAMPLE 45

The coating solution for a colored antistatic film obtained in Example 13 was coated on the surface of a face panel of a cathode ray tube for 60 seconds at a rotational speed of 100 rpm and left to stand still at room temperature for 5 minutes. Then, solution P was coated thereon for 60 seconds at a rotational speed of 100 rpm and then heated at 370° C. for 5 minutes to obtain a low reflection antistatic colored film.

EXAMPLE 46

The coating solution for a colored antistatic film obtained in Example 14 was coated on the surface of a face panel of a cathode ray tube for 60 seconds at a rotational speed of 100 rpm and then heated at 380° C. for 30 minutes. Then, solution P was coated thereon for 60 seconds at a rotational speed of 100 rpm and then heated at 450° C. for 30 minutes to obtain a low reflection antistatic colored film.

EXAMPLE 47

The coating solution for a colored film obtained in Example 15 was coated on the surface of a face plate of a cathode ray tube for 60 seconds at a rotational speed of 100 rpm and left to stand still at room temperature for 5 minutes. Then, solution P was coated thereon for 60 seconds at a rotational speed of 100 rpm and then heated at 160° C. for 5 minutes to obtain a low reflection colored film.

EXAMPLE 48

Ti(OPr)$_2$(acac)$_2$ was dissolved in ethanol so that the solid content would be 15 wt %. Then, water (an aqueous solution acidified with hydrochloric acid to pH2.8) was added in an amount of 8 mols per mol of Ti(OPr)$_2$(acac)$_2$, and the mixture was stirred at room temperature for 24 hours. Then, this solution was diluted with ethanol to a solid content of 5 wt %. Then, this solution was further diluted with a mixed organic solvent comprising ethanol, butanol, ethylene glycol monomethyl ether and diacetone alcohol (weight ratio of ethanol:butanol:ethylene glycol monomethyl ether:diacetone alcohol=5:3:60:20) to a solid content of 0.75 wt % (solution A$^3$).

The coating solution for a colored antistatic film obtained in Example 13 was coated on the surface of a face panel of a cathode ray tube for 60 seconds at a rotational speed of 100 rpm and left to stand still at room temperature for 5 minutes. Then, solution A$^3$ was coated thereon for 60 seconds at a rotational speed of 100 rpm and then heated at 250° C. for 5 minutes. Further, solution P was coated thereon for 60 seconds at a rotational speed of 100 rpm and then heated at 370° C. for 5 minutes to obtain a low reflection antistatic colored film.

EXAMPLE 49

Zr(OBu)$_2$(acac)$_2$ was dissolved in ethanol so that the solid content would be 15 wt %. Then, water (an aqueous solution acidified with hydrochloric acid to pH2.8) was added in an amount of 8 mols per mol of Zr(OBu)$_2$(acac)$_2$, and the mixture was stirred at room temperature for 24 hours. Then, this solution was diluted with ethanol to a solid content of 5 wt %. Further, this solution was diluted with a mixed organic solvent comprising ethanol, ethylene glycol monomethyl ether and diacetone alcohol (weight ratio of ethanol:ethylene glycol monomethyl ether:diacetone alcohol=70:30:10) to a solid content of 0.7 wt % (solution O$^3$).

The coating solution for a colored antistatic film obtained in Example 8 was coated on the surface of a face panel of a cathode ray tube for 60 seconds at a rotational speed of 100 rpm and left to stand still at room temperature for 5 minutes. Then, solution O$^3$ was coated thereon for 60 seconds at a rotational speed of 100 rpm and then heated at 200° C. for 5 minutes. Further, solution P was coated thereon for 60 seconds at a rotational speed of 100 rpm and then heated at 370° C. for 5 minutes to obtain a low reflection antistatic colored film.

EXAMPLE 50

To an ethanol solution of CH$_3$Si(OEt)$_3$ (solid content: 10 wt % as calculated as oxide), water (an aqueous solution acidified with hydrochloric acid to pH2.5) was added in an amount of 8 mols per mol of CH$_3$Si(OEt)$_3$, and the mixture was heated and refluxed for two hours at 80° C. Further, the solution was diluted with ethanol to a solid content of 5 wt % and further diluted with a mixed solvent in a weight ratio of water:ethanol:propylene glycol monomethyl ether acetate:IPA:diacetone alcohol=5.3:22.5:38:23:10 to a solid content of 0.8 wt % (solution C$^2$). The coating solution for a colored antistatic film obtained in Example 13 was coated on the surface of a face panel of a cathode ray tube for 60 seconds at a rotational speed of 100 rpm and left to stand still at room temperature for 5 minutes. Then, solution C$^2$ was coated thereon for 60 seconds at a rotational speed of 100 rpm and then heated at 200° C. for 60 minutes to obtain a low reflection antistatic colored film.

Comparative Example 12

The coating solution obtained in Comparative Example 1 was coated on the surface of a face panel of a cathode ray tube for 60 seconds at a rotational speed of 100 rpm and then heated at 60° C. for 10 minutes. Then, solution P was coated thereon for 60 seconds at a rotational speed of 100 rpm and then heated at 160° C. for 5 minutes to obtain a film.

Comparative Example 13

The coating solution obtained in Comparative Example 2 was coated on the surface of a face panel of a cathode ray tube for 60 seconds at a rotational speed of 100 rpm and then heated at 60° C. for 10 minutes. Then, solution P was coated thereon for 60 seconds at a rotational speed of 100 rpm and then heated at 350° C. for 5 minutes to obtain a film.

Comparative Example 14

The coating solution obtained in Comparative Example 5 was coated on the surface of a face panel of a cathode ray tube for 60 seconds at a rotational speed of 100 rpm and then heated at 60° C. for 10 minutes. Then, solution P was coated thereon for 60 seconds at a rotational speed of 100 rpm and then heated at 160° C. for 10 minutes to obtain a film. The results of Examples 1 to 16 and Comparative Examples 1 to 5 are shown in Table 1.

TABLE 1

|  | Average particle size immediately after the preparation (nm) | Average particle size upon expiration of 4 weeks (nm) |
| --- | --- | --- |
| Example 1 | 95 | 97 |
| Example 2 | 130 | 137 |
| Example 3 | 80 | 76 |
| Example 4 | 75 | 78 |
| Example 5 | 153 | 147 |
| Example 6 | 130 | 140 |
| Example 7 | 60 | 53 |
| Example 8 | 80 | 81 |
| Example 9 | 89 | 90 |
| Example 10 | 78 | 90 |
| Example 11 | 70 | 68 |
| Example 12 | 60 | 56 |
| Example 13 | 60 | 67 |
| Example 14 | 120 | 160 |
| Example 15 | 240 | 450 |
| Example 16 | 332 | 1256 |
| Comparative Example 1 | 180 | 250 |
| Comparative Example 2 | 256 | 1080 |
| Comparative Example 3 | 140 | 170 |
| Comparative Example 4 | 195 | 270 |
| Comparative Example 5 | 67 | 65 |

The results of Examples 17 to 32 and Comparative Examples 6 to 11 are shown in Tables 2 and 3.

TABLE 2

|  | Decrease (%) of transmittance | | | Haze (%) | Scratch resistance | Pencil hardness |
| --- | --- | --- | --- | --- | --- | --- |
|  | 380 nm | 550 nm | 780 nm | | | |
| Example 17 | 23 | 24 | 21 | 0.8 | ○ | 7 H |
| Example 18 | 10 | 12 | 11 | 0.8 | ○ | 7 H |
| Example 19 | 12 | 10 | 10 | 0.9 | ○ | 7 H |
| Example 20 | 8 | 10 | 10 | 0.7 | ○ | 7 H |
| Example 21 | 10 | 12 | 11 | 1.5 | ○ | 6 H |
| Example 22 | 10 | 9 | 9 | 1.3 | ○ | 6 H |
| Example 23 | 7 | 6 | 6 | 0.5 | ○ | 7 H |

TABLE 2-continued

|  | Decrease (%) of transmittance | | | | Scratch | Pencil |
|---|---|---|---|---|---|---|
|  | 380 nm | 550 nm | 780 nm | Haze (%) | resistance | hardness |
| Example 24 | 10 | 12 | 11 | 1.0 | ○ | 7 H |
| Example 25 | 10 | 12 | 11 | 1.1 | ○ | 4 H |
| Example 26 | 18 | 19 | 18 | 0.8 | Δ | 3 H |
| Example 27 | 18 | 18 | 17 | 0.8 | Δ | 3 H |
| Example 28 | 17 | 16 | 16 | 0.8 | Δ | 3 H |
| Example 29 | 10 | 12 | 11 | 1.0 | ○ | 7 H |
| Example 30 | 10 | 12 | 11 | 0.8 | Δ | 4 H |
| Example 31 | 10 | 12 | 11 | 2.5 | Δ | 4 H |
| Example 32 | 10 | 12 | 11 | 3.2 | Δ | 3 H |
| Comparative Example 6 | 2 | 1 | 1 | 1.9 | ○ | 7 H |
| Comparative Example 7 | 0 | 0 | 0 | 1.0 | ○ | 9 H |
| Comparative Example 8 | 4 | 1 | 1 | 4.1 | × | H |
| Comparative Example 9 | 5 | 2 | 1 | 1.7 | Δ | 4 H |
| Comparative Example 10 | 2 | 1 | 0 | 2.4 | × | 3 H |
| Comparative Example 11 | 0 | 0 | 0 | 0.3 | ○ | 7 H |

TABLE 3

|  | surface resistance ($\Omega/\square$) | Surface condition of coated film |
|---|---|---|
| Example 17 | — | Good |
| Example 18 | — | Good |
| Example 19 | — | Good |
| Example 20 | $1 \times 10^9$ | Good |
| Example 21 | $4 \times 10^9$ | Good |
| Example 22 | $1 \times 10^8$ | Good |
| Example 23 | $4 \times 10^8$ | Good |
| Example 24 | $1 \times 10^9$ | Good |
| Example 25 | $3 \times 10^9$ | Good |
| Example 26 | $8 \times 10^9$ | Good |
| Example 27 | $9 \times 10^9$ | Good |
| Example 28 | $5 \times 10^9$ | Good |
| Example 29 | $1 \times 10^9$ | Good |
| Example 30 | $1 \times 10^4$ | Good |
| Example 31 | — | Flow marks of particles |
| Example 32 | — | Flow marks of particles |
| Comparative Example 6 | $>1 \times 10^{13}$ | Radial streaks |
| Comparative Example 7 | $>1 \times 10^{13}$ | Radial streaks |
| Comparative Example 8 | $>1 \times 10^{13}$ | Flow marks of particles |
| Comparative Example 9 | $>1 \times 10^{13}$ | Flow marks of particles |
| Comparative Example 10 | $8 \times 10^9$ | Flow marks of particles |
| Comparative Example 11 | $1 \times 10^8$ | Good |

The results of Examples 33 to 50 and Comparative Examples 12 to 14 are shown in Tables 4, 5 and 6.

TABLE 4

|  | Decrease (%) of transmittance | | | | Scratch | Pencil |
|---|---|---|---|---|---|---|
|  | 380 nm | 550 nm | 780 nm | Haze (%) | resistance | hardness |
| Example 33 | 24 | 25 | 24 | 0.6 | ○ | 8 H |
| Example 34 | 10 | 12 | 11 | 0.7 | ○ | 7 H |
| Example 35 | 12 | 10 | 10 | 0.9 | ○ | 7 H |
| Example 36 | 8 | 10 | 10 | 0.7 | ○ | 7 H |
| Example 37 | 10 | 12 | 11 | 1.2 | ○ | 7 H |
| Example 38 | 12 | 12 | 11 | 1.0 | ○ | 6 H |
| Example 39 | 9 | 8 | 8 | 0.5 | ○ | 7 H |
| Example 40 | 10 | 12 | 11 | 1.0 | ○ | 7 H |
| Example 41 | 10 | 12 | 11 | 0.9 | ○ | 9 H |
| Example 42 | 21 | 20 | 18 | 0.8 | ○ | 9 H |
| Example 43 | 22 | 21 | 19 | 0.8 | ○ | 9 H |
| Example 44 | 20 | 19 | 20 | 0.8 | ○ | 9 H |
| Example 45 | 13 | 14 | 13 | 1.0 | ○ | 9 H |
| Example 46 | 12 | 12 | 12 | 0.8 | ○ | 9 H |
| Example 47 | 11 | 14 | 13 | 2.0 | ○ | 9 H |
| Example 48 | 10 | 12 | 11 | 1.6 | ○ | 9 H |
| Example 49 | 10 | 10 | 12 | 1.9 | ○ | 9 H |
| Example 50 | 12 | 14 | 11 | 1.0 | ○ | 6 H |
| Comparative Example 12 | 2 | 1 | 1 | 1.6 | ○ | 7 H |
| Comparative Example 13 | 6 | 3 | 1 | 3.6 | Δ | 4 H |
| Comparative Example 14 | 0 | 0 | 0 | 0.3 | ○ | 9 H |

TABLE 5

|  | surface resistance ($\Omega/\square$) | Surface condition of coated film |
|---|---|---|
| Example 33 | — | Good |
| Example 34 | — | Good |
| Example 35 | — | Good |
| Example 36 | $1 \times 10^9$ | Good |
| Example 37 | $4 \times 10^9$ | Good |
| Example 38 | $1 \times 10^8$ | Good |
| Example 39 | $4 \times 10^8$ | Good |
| Example 40 | $1 \times 10^9$ | Good |
| Example 41 | $3 \times 10^9$ | Good |
| Example 42 | $8 \times 10^9$ | Good |
| Example 43 | $9 \times 10^9$ | Good |
| Example 44 | $5 \times 10^9$ | Good |
| Example 45 | $1 \times 10^9$ | Good |
| Example 46 | $1 \times 10^4$ | Good |
| Example 47 | $1 \times 10^9$ | Good |
| Example 48 | $1 \times 10^8$ | Good |
| Example 49 | $3 \times 10^8$ | Good |
| Example 50 | $1 \times 10^9$ | Good |
| Comparative Example 12 | $>1 \times 10^{13}$ | Radial streaks |
| Comparative Example 13 | $>1 \times 10^{13}$ | Flow mark of particles |
| Comparative Example 14 | $2 \times 10^8$ | Good |

TABLE 6

|  | Spectral reflectance (%) | | | Luminous reflectance (%) | Color of reflected light |
|---|---|---|---|---|---|
|  | 380 nm | 550 nm | 780 nm | | |
| Example 33 | 6.5 | 0.5 | 2.9 | 0.6 | Dark purple |
| Example 34 | 6.8 | 0.8 | 3.2 | 0.9 | Dark purple |
| Example 35 | 5.2 | 0.5 | 3.2 | 0.7 | Blue |
| Example 36 | 5.6 | 0.8 | 3.9 | 0.9 | Blue |
| Example 37 | 6.0 | 0.8 | 4.0 | 0.9 | Blue |
| Example 38 | 5.8 | 0.5 | 2.9 | 0.6 | Blue |
| Example 39 | 4.0 | 0.4 | 2.5 | 0.4 | Pale blue |
| Example 40 | 4.8 | 0.5 | 3.1 | 0.6 | Blue |
| Example 41 | 4.0 | 0.5 | 2.9 | 0.5 | Pale blue |
| Example 42 | 5.8 | 0.8 | 3.5 | 1.0 | Dark purple |
| Example 43 | 6.1 | 1.0 | 3.6 | 1.3 | Dark purple |
| Example 44 | 6.1 | 1.2 | 3.6 | 1.5 | Dark purple |
| Example 45 | 3.8 | 0.3 | 2.5 | 0.4 | Pale blue |
| Example 46 | 7.1 | 0.5 | 4.3 | 0.5 | Dark purple |
| Example 47 | 7.5 | 1.8 | 2.9 | 2.1 | Pale blue |
| Example 48 | 5.2 | 0.2 | 2.9 | 0.4 | Pale blue |
| Example 49 | 4.2 | 0.3 | 2.5 | 0.5 | Pale blue |
| Example 50 | 5.8 | 0.6 | 2.5 | 0.9 | Purple |
| Comparative Example 12 | 4.2 | 3.8 | 2.5 | 4.6 | White |
| Comparative Example 13 | 4.0 | 1.0 | 4.8 | 1.8 | Pale red |
| Comparative Example 14 | 6.8 | 0.5 | 3.6 | 0.9 | Blue |

The coating solution of the present invention contains a metal oxide containing nitrogen and by properly selecting a solvent, it will be excellent in the stability for a long period of time and capable of providing an excellent colored film, colored antistatic film, colored low reflection antistatic film, which has uniform absorption over the entire visible light range with little defects such as flow marks of the liquid or flow marks of particles at the time of coating by a spin coating method, flocculation of particles during drying of the film, nonuniformity in drying, nonuniformity in the film thickness and the like.

The colored film, the colored antistatic film and the colored low reflection antistatic film of the present invention can be treated by low temperature heat treatment and have uniform absorption over the entire visible light range, whereby they are excellent in the low reflection property.

Further, the titanium oxide containing nitrogen has electrical conductivity by itself and thus provides an antistatic property. The present invention is excellent in the productivity and requires no vacuuming, whereby the apparatus may be relatively inexpensive. The invention is applicable to a substrate with a large area such as a face panel of a cathode ray tube and mass production is possible. Thus, the industrial value of the invention is very high.

The colored film of the present invention provides a pale reflection color (a pale blue color) which is usually preferred rather than a strong color (a dark purple color). The colored film of the present invention is suitable for use as a colored film of blue color type useful for the surface of a cathode ray tube.

What is claimed is:

1. A colored anti-reflective film, which is formed on a glass substrate by coating the glass substrate with a solution comprising a superfine particle sol of nitrogen-containing metal oxide particles in an amount such that the particles constitute from 1 to 80 wt. % of the coated film prepared, wherein said particles have a size of from 5 to 200 nanometers and the oxygen is stoichiometrically deficient, a compound of the formula $Si(OR)_m R_n$ (m+n=4, m=1 to 4, n=0 to 3, R=$C_1$-$C_4$ alkyl group) or its hydrolyzate, and $NH_3$, and then followed by subjecting the coating on the glass substrate to at least one treatment selected from the group consisting of heating and irradiating the coating with ultraviolet rays to produce the anti-reflective film, the transmittance of the film being substantially uniformly reduced within a visible light wavelength range of from 380 nm to 780 nm by absorption of light by the film itself.

2. The colored film formed on a glass substrate according to claim 1, wherein the surface structure of the film is a concave-convex structure, wherein the maximum difference between the concaves and the convexes of this concave-convex structure is at most 500 nm.

3. A multi-layer film formed on a glass substrate, of which at least one layer is a colored thin film as defined in claim 1.

4. A multi-layer film comprising a colored film as defined in claim 1 located on a glass substrate and a film having a refractive index of at most 1.50 formed on the colored film.

5. A glass product comprising a glass panel and a colored film as defined in claim 1 formed thereon.

6. A cathode ray tube having a colored film as defined in claim 1 formed on the surface of a face panel of a cathode ray tube.

7. The colored film according to claim 1 wherein the metal of the metal oxide containing nitrogen is at least one member selected from the group consisting of Ti, Cr, Zr, Hf, Al, Si, Nb, Ta and V.

8. The colored film according to claim 1, wherein the solution contains a β-diketone.

9. The colored film according to claim 1, wherein the solution contains water, a $C_1$–$C_4$ lower alcohol, an ester ether, an ether alcohol and a ketone alcohol, wherein the total of the ester ether and the ether alcohol is from 0.1 to 70 wt %, and the ketone alcohol is from 0.1 to 30 wt %.

10. The colored film according to claim 1, wherein the solution contains water, a $C_1$–$C_4$ lower alcohol, an ester either, an ether alcohol and a polyhydric alcohol, wherein the total of the ester either and the ether alcohol is from 0.1 to 70 wt %, and the polyhydric alcohol is from 0.1. to 30 wt %.

11. The colored film according to claim 1, wherein the solution contains at least on compound selected from the group consisting of a Sn organic acid salt and a Co organic acid salt.

12. The colored film according to claim 11, wherein the compound is a Sn organic acid salt selected from the group consisting of stannous naphthenate and tin 2-ethylhexanoate.

13. The colored film according to claim 11 wherein the compound is a Co organic acid salt selected from the group consisting of cobaltous naphthenate and cobalt 2-ethylhexanoate.

14. The colored film according to claim 1, wherein the solution contains as an additional component a compound of at least one element selected from the group consisting of Sn, In, Sb, Zn, Al and Ga.

15. The colored film according to claim 14, wherein the compound of at least one element selected from the group consisting of Sn, In, Sb, Zn, Al and Ga is in the form of oxide particles having an average primary particle size of from 5 to 200 nm.

16. The colored film according to claim 14, wherein the compound of at least one element selected from the group consisting of Sn, In, Sb, Zn, Al and Ga is in the form of a superfine particle sol obtained by peptization and pulverization in a solvent by means of quartz beads having an average particle size of at most 0.1 mm.

17. The colored film according to claim 16 wherein the solvent used for peptization and pulverization is a basic aqueous solution containing at least 5 wt %, based on the object to be pulverized, of at least one member selected from the group consisting of lithium hydroxide, sodium hydroxide and potassium hydroxide.

18. The colored film according to claim 16, wherein the aqueous solution is thereafter heated at a temperature of 30° to 80° C.

19. The colored film according to claim 14, wherein the compound of at least one element selected from the group consisting of Sn, In, Sb, Zn, Al and Ga is in the form of a superfine particle sol obtained by peptization and pulverization in a solvent by means of quartz beads having an average particle size of at least 0.1 mm, followed by heating.

20. The colored film according to claim 19, wherein the solvent used for peptization and pulverization is a basic aqueous solution containing at least 5 wt %, based on the object to be pulverized, of at least one member selected from the group consisting of lithium hydroxide, sodium hydroxide and potassium hydroxide.

21. The colored film according to claim 1, wherein the metal oxide containing nitrogen is an oxide of titanium containing nitrogen.

22. The colored film according to claim 21, wherein the oxide of titanium containing nitrogen is $TiO_x$ ($1.0 \leq x < 2$) containing from 0.1 to 30 wt % of nitrogen.

23. The colored film according to claim 21, wherein the oxide of titanium containing nitrogen is in the form of particles having an average primary particle size of from 5 to 200 nm.

24. The colored film according to claim 23, wherein the solution contains a compound of at least one element selected from the group consisting of Sn, In, Sb, Zn, Al and Ga in the form of oxide particles having an average primary particle size of from 5 to 200 nm.

25. The colored film according to claim 21, wherein the oxide of titanium containing nitrogen is in the form of a superfine particle sol obtained by peptization and pulverization in a solvent by means of quartz beads of an average particle size of at most 0.1 mm, followed by heating.

26. The colored film according to claim 25, wherein the solvent used for peptization and pulverization is a basic aqueous solution containing at least 5 wt %, based on the object to be pulverized, of at least one member selected from the group consisting of lithium hydroxide, sodium hydroxide and potassium hydroxide.

27. The colored film according to claim 21, wherein the oxide of titanium containing nitrogen is in the form of a superfine particle sol obtained by peptization and pulverization in a solvent by means of quartz beads of an average particle size of at most 0.1 mm.

28. The colored film according to claim 27 wherein the solvent used for peptization and pulverization is a basic aqueous solution containing at least 5 wt %, based on the object to be pulverized, of at least one member selected from the group consisting of lithium hydroxide, sodium hydroxide and potassium hydroxide.

29. The colored film according to claim 28, wherein lithium, sodium and potassium ions in the basic aqueous solution are removed to a level of at most 100 ppm after the peptization and pulverization, and then $NH_3$ is added to the aqueous solution.

30. The colored film formed on a glass substrate according to claim 28, wherein the surface structure of the film is a concave-convex structure, wherein the maximum difference between the concaves and the convexes of this concave-convex structure is at most 500 nm.

31. A multi-layer film formed on a glass substrate, of which at least one layer is a colored thin film as defined in claim 28.

32. A multi-layer film comprising a colored film as defined in claim 28 located on a glass substrate and a film having a refractive index of at most 1.50 formed on the colored film.

33. A glass product comprising a glass panel and a colored film as defined in claim 28 formed thereon.

34. A cathode ray tube having a colored film as defined in claim 28 formed on the surface of a face panel of a cathode ray tube.

* * * * *